(12) United States Patent
Ederer et al.

(10) Patent No.: US 11,826,958 B2
(45) Date of Patent: Nov. 28, 2023

(54) EXCHANGEABLE PROCESS UNIT

(71) Applicant: Voxeljet AG, Friedberg (DE)

(72) Inventors: Ingo Ederer, Geltendorf (DE); Bastian Heymel, Augsburg (DE); Josef Grasegger, Stadtbergen (DE); Martin Sinzinger, Augsburg (DE)

(73) Assignee: VOXELJET AG, Friedberg (DE)

( * ) Notice: Subject to any disclaimer, the term of this patent is extended or adjusted under 35 U.S.C. 154(b) by 118 days.

(21) Appl. No.: 17/428,243

(22) PCT Filed: Feb. 4, 2020

(86) PCT No.: PCT/DE2020/000016
§ 371 (c)(1),
(2) Date: Aug. 3, 2021

(87) PCT Pub. No.: WO2020/160724
PCT Pub. Date: Aug. 13, 2020

(65) Prior Publication Data
US 2022/0288849 A1 Sep. 15, 2022

(30) Foreign Application Priority Data
Feb. 5, 2019 (DE) ............. 10 2019 000 796.4

(51) Int. Cl.
*B29C 64/30* (2017.01)
*B29C 64/165* (2017.01)
*B29C 64/214* (2017.01)
*B29C 64/264* (2017.01)
*B29C 64/209* (2017.01)
(Continued)

(52) U.S. Cl.
CPC ............ *B29C 64/30* (2017.08); *B29C 64/106* (2017.08); *B29C 64/165* (2017.08); *B29C 64/209* (2017.08); *B29C 64/214* (2017.08); *B29C 64/218* (2017.08); *B29C 64/264* (2017.08); *B33Y 10/00* (2014.12); *B33Y 30/00* (2014.12); *B33Y 40/00* (2014.12)

(58) Field of Classification Search
CPC ........ B29C 64/209; B29C 64/30; B33Y 40/00
See application file for complete search history.

(56) References Cited

U.S. PATENT DOCUMENTS

| 4,247,508 A | 1/1981 | Housholder |
| 4,575,330 A | 3/1986 | Hull |

(Continued)

FOREIGN PATENT DOCUMENTS

| AU | 720255 B2 | 5/2000 |
| CN | 101146666 A | 3/2008 |

(Continued)

OTHER PUBLICATIONS

US 4,937,420 A, 06/1990, Deckard (withdrawn)
(Continued)

*Primary Examiner* — Atul P. Khare
(74) *Attorney, Agent, or Firm* — The Dobrusin Law Firm, P.C.

(57) ABSTRACT

The invention relates to a device and to a method for producing 3D moulded parts using at least one process unit, also suitable for a large scale production in series of 3D moulded parts such as foundry cores and moulds and other articles which are required in large amounts.

20 Claims, 14 Drawing Sheets

(51) Int. Cl.
*B29C 64/106* (2017.01)
*B29C 64/218* (2017.01)
*B33Y 10/00* (2015.01)
*B33Y 30/00* (2015.01)
*B33Y 40/00* (2020.01)

(56) References Cited

U.S. PATENT DOCUMENTS

| | | |
|---|---|---|
| 4,665,492 A | 5/1987 | Masters |
| 4,752,352 A | 6/1988 | Feygin |
| 4,752,498 A | 6/1988 | Fudim |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,134,569 A | 7/1992 | Masters |
| 5,136,515 A | 8/1992 | Helinski |
| 5,149,548 A | 9/1992 | Yamane et al. |
| 5,155,324 A | 10/1992 | Deckard et al. |
| 5,156,697 A | 10/1992 | Bourell et al. |
| 5,248,456 A | 8/1993 | Evans, Jr. et al. |
| 5,252,264 A | 10/1993 | Forderhase et al. |
| 5,284,695 A | 2/1994 | Barlow et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,503,785 A | 4/1996 | Crump et al. |
| 5,518,060 A | 5/1996 | Cleary et al. |
| 5,518,680 A | 5/1996 | Cima et al. |
| 5,555,176 A | 9/1996 | Menhennett et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,824,250 A | 10/1998 | Whalen |
| 5,851,465 A | 12/1998 | Bredt |
| 5,884,688 A | 3/1999 | Hinton et al. |
| 5,902,537 A | 5/1999 | Almquist et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,048,188 A | 4/2000 | Hull et al. |
| 6,048,954 A | 4/2000 | Barlow et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,335,097 B1 | 1/2002 | Otsuka et al. |
| 6,375,874 B1 | 4/2002 | Russell et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höschmann et al. |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 9,969,122 B1 | 5/2018 | Smiddy |
| 10,799,989 B2 * | 10/2020 | Ederer ................. B29C 64/20 |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2002/0186270 A1 | 12/2002 | Sharma |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0276976 A1 | 12/2005 | Pfeifer et al. |
| 2005/0280185 A1 | 12/2005 | Russell et al. |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |

(56) References Cited

U.S. PATENT DOCUMENTS

| | | |
|---|---|---|
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2010/0007048 A1 | 1/2010 | Schweininger |
| 2010/0007062 A1 | 1/2010 | Larsson et al. |
| 2010/0207288 A1 | 8/2010 | Dini |
| 2010/0212584 A1 | 8/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2015/0042018 A1 | 2/2015 | Gunther et al. |
| 2015/0110910 A1 | 4/2015 | Hartmann et al. |
| 2015/0224718 A1 | 8/2015 | Ederer et al. |
| 2015/0266238 A1 | 9/2015 | Ederer et al. |
| 2015/0268099 A1 | 9/2015 | Craig et al. |
| 2015/0273572 A1 | 10/2015 | Ederer et al. |
| 2015/0290881 A1 | 10/2015 | Ederer et al. |
| 2015/0375419 A1 | 12/2015 | Gunther et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2017/0050378 A1 | 2/2017 | Ederer |
| 2017/0072643 A1 | 3/2017 | Ng et al. |
| 2017/0072644 A1 | 3/2017 | Ng et al. |
| 2017/0106595 A1 | 4/2017 | Gunther et al. |
| 2017/0113415 A1 | 4/2017 | Desimone et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0079133 A1 | 3/2018 | Ederer et al. |
| 2018/0133957 A1 | 5/2018 | Ramirez Muela et al. |
| 2018/0141271 A1 | 5/2018 | Gunter et al. |
| 2018/0200956 A1 | 7/2018 | Grach et al. |
| 2018/0326662 A1 | 11/2018 | Gunther et al. |
| 2018/0339452 A1 | 11/2018 | Heymel et al. |
| 2018/0369910 A1 | 12/2018 | Gunter et al. |
| 2019/0047218 A1 | 2/2019 | Ederer et al. |
| 2019/0084229 A1 | 3/2019 | Gunther |
| 2019/0263051 A1 | 8/2019 | Sanchez Ribes et al. |
| 2020/0055246 A1 | 2/2020 | Gunther et al. |
| 2020/0130263 A1 | 4/2020 | Gunther et al. |
| 2020/0189259 A1 | 6/2020 | Hartmann et al. |
| 2020/0262141 A1 | 8/2020 | Ederer et al. |
| 2021/0316507 A1 | 10/2021 | Grasegger et al. |
| 2022/0219289 A1 | 7/2022 | Griesser et al. |
| 2022/0258412 A1 | 8/2022 | Scheck et al. |
| 2023/0081209 A1 | 3/2023 | Ederer et al. |

FOREIGN PATENT DOCUMENTS

| | | |
|---|---|---|
| CN | 103635305 A | 3/2014 |
| CN | 108463329 A | 8/2018 |
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 A1 | 2/1995 |
| DE | 29506204 U1 | 6/1995 |
| DE | 4440397 | 9/1995 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 102006040305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| EP | 0361847 B1 | 4/1990 |
| EP | 0 431 924 A2 | 6/1991 |
| EP | 1415792 | 5/2004 |
| EP | 1457590 A | 9/2004 |
| EP | 2202016 A1 | 6/2010 |
| GB | 2297516 A | 8/1996 |
| GB | 2548340 A | 9/2017 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |
| WO | 01/40866 A2 | 6/2001 |
| WO | 2004/014637 A1 | 2/2004 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/090207 A1 | 6/2014 |
| WO | 2014/166469 A1 | 10/2014 |
| WO | 2015/038072 A1 | 3/2015 |
| WO | 2015/177598 A1 | 11/2015 |
| WO | 2016/019942 A1 | 2/2016 |
| WO | 2017/008777 A1 | 1/2017 |
| WO | 2017/211610 A1 | 12/2017 |

OTHER PUBLICATIONS

Armin Scharf, "Erster 3D-Endlosdrucker", zwomp.de, http://www.zwomp.de/2012/11/06/voxeljet-endlosdrucker/ dated Nov. 6, 2012.

Cima et al., "Computer-derived Microstructures by 3D Printing: Bio- and Structural Materials," SFF Symposium, Austin, TX, 1994.

(56) References Cited

OTHER PUBLICATIONS

EOS Operating Manual for Laser Sintering Machine with Brief Summary Feb. 22, 2005.
Feature Article—Rapid Tooling—Cast Resin and Sprayed Metal Tooling by Joel Segal, Apr. 2000.
Gebhart, Rapid Prototyping, pp. 118-119, 1996.
Jacobs et al., 2005 SME Technical Paper, title "Are QuickCast Patterns Suitable for Limited Production?".
Marcus et al., Solid Freedom Fabrication Proceedings, Nov. 1993.
Marcus, et al., Solid Freeform Fabrication Proceedings, Sep. 1995, pp. 130-133.
Sachs et al., "Three-Dimensional Printing: Rapid Tooling and Prototypes Directly from a CAD Model", Massachusetts Institute of Technology, pp. 143-151, Jan. 1990.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Screen shots of URL: http://www.youtube.com/watch?v=hgIrNXZjIxU taken in approximately 5 second intervals on Nov. 12, 2015.
Williams, "Feasibility Study of Investment Casting Pattern Design by Means of Three Dimensional Printing", Department of Mechanical Engineering, abstract only; Sep. 25, 2001.
International Search Report & Written Opinion, PCT Application No. PCT/DE2020/000016 dated Aug. 13, 2020.

* cited by examiner

Part A

Part B

EXCHANGEABLE PROCESS UNIT

The invention relates to a device and to a method for producing 3D molded parts using at least one process unit, also suitable for large scale series production of 3D molded parts such as foundry cores and molds and other articles which are required in large quantities.

European Patent EP 0 431 924 B1 describes a process for producing three-dimensional objects based on computer data. In the process, a thin layer of particulate material is deposited on a platform by means of a coater (recoater) and has a binder material selectively printed thereon by means of a print head. The particulate region with the binder printed thereon bonds and solidifies under the influence of the binder and, optionally, an additional hardener. Next, the construction platform is lowered by one layer thickness or the coater/print head unit is raised and a new layer of particulate material is applied, the latter also being printed on selectively as described above. These steps are repeated until the desired height of the object is achieved. Thus, the printed and solidified regions form a three-dimensional object (molded part).

Upon completion, the object made of solidified particulate material is embedded in loose particulate material, from which it is subsequently freed. For this purpose, a suction device may be used, for example. This leaves the desired objects, which are then further cleaned to remove any residual powder, e.g. by brushing it off.

Other powder-based rapid prototyping processes, e.g. selective laser sintering or electron beam sintering, work in a similar manner, also applying loose particulate material layer by layer and selectively solidifying it using a controlled physical source of radiation.

In the following, all these processes will be summarized by the term "three-dimensional printing method" or "3D printing method".

Some of these methods use different coating options. In some methods, the particulate material required for the entire layer is placed in front of a thin blade. The latter is then moved over the construction area, spreading the material placed in front of it and thereby smoothing it. Another type of layer application consists in continuously placing a small volume of particulate material in front of the blade as it moves. For this purpose, the blade is usually mounted to the underside of a movable silo. Directly above or next to the blade, an adjustable gap is provided through which the particulate material can flow out of the silo. The flow is stimulated by introducing oscillations into the silo/blade system.

Subsequently or during the application of the layer, selective solidification follows by means of liquid application and/or exposure to radiation. In many cases it is necessary for the quality of the print that the distance of the moving printing device to the current layer plane be as constant as possible.

The parts are usually present in a construction container after printing. In most cases, said construction container constitutes a cuboid volume. The volume is charged with a wide variety of geometries so as to make efficient use of the machine.

Some prior art printers have construction containers which can be removed from the system and are also referred to as job boxes or construction containers. They serve as boundaries for the powder, thereby stabilizing the construction process. Changing the construction container allows the process steps to be carried out in parallel, thus making efficient use of the system. There are also systems which involve printing on a platform which can be removed from the system, just like the construction container. Methods are also known which involve printing on a continuous conveyor belt at a certain angle. The aforementioned machine features allowed to make construction processes more economical and help reduce downtime. However, well-known 3D printers still have the disadvantage that considerable downtimes of the machines mean a suboptimal degree of utilization.

3D printing on the basis of pulverulent materials and introduction of liquid binders is the quickest method among the layer construction techniques. This method allows the processing of different particulate materials, including—as a non-exhaustive example—natural biological raw materials, polymeric plastic materials, metals, ceramics and sands.

The different parts of the system exhibit different degrees of wear. Depending on the type of pulverulent material, e.g. all conveying equipment, blades, seals and lines in contact with the powder are subject to specific abrasion. This can lead to process-relevant equipment such as a coater blade, whose geometric shape is very important for the layer application result, having to be replaced at regular intervals in order to prevent an intolerable drop in quality or even failure of the system part. The same applies to the print head, whose nozzles are also subject to wear, which can lead to a drop in the performance of the respective nozzle on the one hand and total failure on the other. The print heads usually have a large number of nozzles. The nozzles are usually located next to each other in a so-called nozzle plate. For 3D printing, it is tolerable in most cases if individual nozzles of a print head have failed. However, if the failure affects a larger number of nozzles or if a majority of nozzles are affected that are directly next to each other, it is necessary to replace the print head.

It is important here that the nozzles have the same distance to the construction field when printing the binder. If this is not the case, undesired deviations of the print image from the calculated layer image may occur. In order for the distance to remain the same, the print head must be moved parallel to the plane of the construction field when sweeping over the latter during printing and the nozzle plate must be parallel to the plane of the construction field.

The same applies to any built-in radiation sources for hardening or heating the powder. These sources must also be arranged parallel to the construction field plane and move parallel to said plane in order to ensure uniform energy input.

The construction field plane, on the other hand, is determined by the coating blade in contact with the powder and by the coating blade's traversing axis.

Now, if one or more of the components (coating blade, print head or radiation source) is replaced, the spare parts and their receptacles must either be manufactured so precisely that the required parallel alignment is restored, or there must be devices on one of the two elements that allow them to be adjusted to each other.

Usually, the manufacturing accuracy of the parts is not sufficient to meet the accuracy requirements mentioned. For this reason, replacing one of the components requires the system to be switched off for the duration of the replacement and readjustment. Depending on the type of system, this can require several hours of system downtime. In addition, the work must be performed directly on the system by an experienced technician.

European patent application EP 2 214 889 A1 describes a device for a 3D printer that has a mounting platform on which all traversing devices, including the Z-axis, are mounted. The advantage of such an approach is the achievement of high process accuracy through manufacturing precision combined with less adjustment effort. In addition, the required accuracy is taken out of device parts that are more difficult to machine, such as the frame. In terms of simplified maintenance and increased availability of the device, this approach does not provide any advantages, since replacing the mounting platform with all connections and units is extremely complex. The presently described invention according to the present disclosure is not only novel, but also inventive over this prior art document.

The aforementioned downtimes of 3D printing systems imply significant economic disadvantages and especially for 3D printing systems or system lines that are designed to achieve a high production throughput, the aforementioned downtimes are problematic or even incompatible with the required production targets.

Also, in many cases 3D printing machines cannot be integrated into series production because they require excessively long downtimes for maintenance work.

It is therefore an object underlying the application to provide a device with which it is possible to exchange functional parts of a 3D printing machine, such as coater, print head or radiation source, on the 3D printer in a short time.

A further object underlying the application is to provide a device which helps to avoid the need for adjusting the functional parts in the 3D printing machine.

It is a further object underlying the application to provide a 3D printing machine that can be integrated into system lines and that is characterized by reduced downtimes for maintenance work or generally requires only low downtimes.

BRIEF SUMMARY OF THE DISCLOSURE

In one aspect, the disclosure relates to an exchangeable function unit suitable for a 3D printing method, said function unit comprising or consisting of at least two functional units comprising at least one material application means for applying a particulate material and/or fluid and at least one means for selectively solidifying the applied material, and optionally having further layer treatment means, wherein the functional units are each single, double, triple or multiple, and wherein the functional units are mechanically connected to each other directly or by a connecting means.

In another aspect, the disclosure relates to a method for exchanging a function unit in a 3D printing machine by moving an exchangeable function unit as described above into and out of the machine.

In another aspect, the disclosure relates to a 3D printing machine suitable for the exchangeable function unit as described above.

DETAILED DESCRIPTION OF THE DISCLOSURE

Figures 1A, 1B:
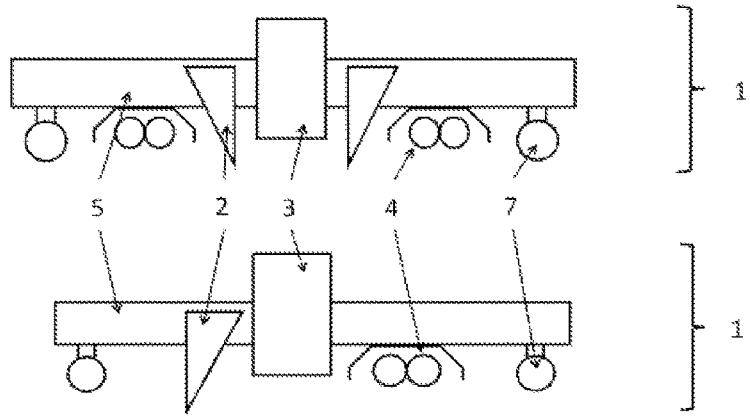
FIGS. 1A and 1B: illustration of different types of exemplary exchangeable function units according to the disclosure.

In the following, several terms will be defined more precisely. Otherwise, the terms used shall have the meanings known to the person skilled in the art.

In the sense of the disclosure, "layer construction methods" or "3D printing methods", respectively, are all methods known from the prior art which enable the construction of parts in three-dimensional molds and are compatible with the process components and devices further described herein.

As used in the disclosure, "binder jetting" means that powder is applied in layers onto a construction platform, one or more liquids is/are printed on the cross-sections of the part on this powder layer, the position of the construction platform is changed by one layer thickness with respect to the previous position, and these steps are repeated until the part is finished. In this context, binder jetting also refers to layer construction methods that require a further process component such as layer-by-layer exposure, e.g. with IR or UV radiation, and methods that are also referred to as high-speed sintering.

A "molded article" or "part" or "3D molded part" or "3D part" in the sense of the disclosure means all three-dimensional objects manufactured by means of 3D printing methods and exhibiting dimensional stability.

"3D printer" or "printer" as used in the disclosure means the device in which a 3D printing method can take place. A 3D printer in the sense of the disclosure comprises a means for applying construction material, e.g. a fluid such as a particulate material, and a solidification unit, e.g. a print head or an energy input means such as a laser or a heat lamp. Other machine components known to the person skilled in the art and components known in 3D printing are combined with the above-mentioned machine components in individual cases, depending on the specific requirements.

A "construction field" is the plane or, in a broader sense, the geometric location on or in which a particulate material bed grows during the construction process by repeated coating with particulate material. The construction field is frequently bounded by a bottom, i.e. the "construction platform", by walls and an open top surface, i.e. the construction plane.

As used in the disclosure, "process unit" or "function unit" refers to a means or a component using which the result of the processes of coating and selective solidification can be realized; this may include coater (recoater), print head, nozzles, laser unit, heat source, UV light source or/and further layer treatment means.

The process of "printing" or "3D printing" in the sense of the disclosure summarizes the operations of material application, selective solidification or imprinting and working height adjustment and takes place in an open or closed process chamber.

A "receiving plane" in the sense of the disclosure means the plane onto which the construction material is applied. In accordance with the disclosure, the receiving plane is always freely accessible in one spatial direction by a linear movement.

A "traversing axis" in the sense of the disclosure is an axis which carries a process unit or which can be produced along the latter, is arranged above the construction field tools and has a long travel compared to the other axes in the system. "Traversing axis" may also indicate the direction in which, for example, a construction field tool is synchronized and can be moved in coordination with other device parts. A print head can also be moved on a "traversing axis".

"Construction field tool" or "functional unit" in the sense of the disclosure refers to any means or device part used for fluid application, e.g. particulate material, and selective solidification in the production of molded parts. Thus, all material application means and layer treatment means are also construction field tools or functional units.

According to the disclosure, "spreading out" means any manner in which the particulate material is distributed. For example, a larger quantity of powder may be placed at the starting position of a coating pass and may be distributed or spread out into the layer volume by a blade or a rotating roller.

As the "construction material" or "particulate material" or "powder" in the sense of the disclosure, all flowable materials known for 3D printing may be used, in particular in the form of a powder, slurry or liquid. These may include, for example, sands, ceramic powders, glass powders and other powders of inorganic or organic materials, such as metal powders, plastic materials, wood particles, fiber materials, celluloses or/and lactose powders, as well as other types of organic, pulverulent materials. The particulate material is preferably a free-flowing powder when dry, but a cohesive, cut-resistant powder may also be used. This cohesiveness may also result from adding a binder material or an auxiliary material, e.g. a liquid. The addition of a liquid can result in the particulate material being free flowing in the form of a slurry. Synthetic resins such as epoxides or acrylates can also be considered as construction materials in the sense of the disclosure. In general, particulate materials may also be referred to as fluids in the sense of the disclosure.

The "surplus quantity" or "overfeed" is the amount of particulate material which is pushed along in front of the coater during the coating pass at the end of the construction field.

"Coater" or "recoater" or "material application means" as used in the disclosure refers to the unit by means of which a fluid is applied onto the construction field. The unit may consist of a fluid reservoir and a fluid application unit wherein, according to the present invention, the fluid application unit comprises a fluid outlet and a "coating knife device". Said coating knife device may be a coating blade. However, any other conceivable, suitable coating knife device may be used. For example, rotating rollers or a nozzle are conceivable as well. Material can be fed via reservoirs in a free-flowing manner or via extruder screws, pressurization or other material conveying devices.

The "print head" or means for selective solidification in the sense of the disclosure usually consists of various components. Among other things, these can be printing modules. The printing modules have a large number of nozzles from which the "binder" is ejected as droplets onto the construction field in a controlled manner. The print modules are aligned with respect to the print head. The print head is aligned with respect to the machine. This allows the position of a nozzle to be assigned to the machine coordinate system. The plane in which the nozzles are located is usually referred to as the nozzle plate. Another means of selective solidification can also be one or more lasers or other radiation sources or a heat lamp. Arrays of such radiation sources, such as laser diode arrays, can also be considered. It is permissible in the sense of the disclosure to implement selectivity separately from the solidification reaction. Thus, a print head or one or more lasers can be used to selectively treat the layer and other layer treatment means can be used to start the solidification process. An example of this would be printing on the layer with UV reactive resins, which are then solidified via a UV light source. In another embodiment, an IR absorber is printed on the particulate material, followed by solidification using an infrared source.

"Layer treatment means" in the sense of the disclosure refers to any means suitable for achieving a certain effect in the layer. This may be the aforementioned units such as print heads or lasers, but also heat sources in the form of IR emitters or other radiation sources such as UV emitters, for example. Means for deionization or ionization of the layer are also conceivable. What all layer treatment means have in common is that their zone of action is distributed linearly over the layer and that, like the other layering units such as the print head or coater, they must be guided over the construction field to reach the entire layer.

"Actuators" in the sense of the disclosure are all technical means which are suitable for triggering the movement of layer treatment means relative to one another within an exchangeable function unit, or for carrying out movements of individual parts or components within the layer treatment means.

"Insertion opening" as used in the disclosure means the area on a 3D printing machine where the exchangeable function unit is inserted into and removed from the 3D printing machine for replacement; this insertion opening may be open or may be closable by suitable means such as a closure or a closable flap. Opening and closing can be done with a separate control; or, by retracting and extending the exchangeable function unit, the closure is automatically opened and closed again. There may also be some kind of barrier at the insertion opening, such as a slitted film or bristles, through which the exchangeable function unit can be pushed.

A "suitable receiving means" in the sense of the disclosure is a means arranged at the target position that assists in the positioning and proper functioning of the exchangeable function unit at the target position. Thus, the positional tolerance of an exchangeable function unit within the 3D printing machine is defined by a suitable receiving means, and thus also the positional tolerance of the layer treatment means with respect to the construction field.

In the sense of the disclosure, "lifting means" refers to a suitable means by which the extended exchangeable function unit is picked up and moved away from the 3D printing machine, or by which the exchangeable function unit is lifted and moved towards the 3D printing machine and by which the exchangeable function unit is inserted into the 3D printing machine. According to the disclosure, this can be a lift truck, a crane, a special tool or an industrial robot.

The "retraction" or "extension" of the exchangeable function unit in the sense of the disclosure is the process in which an exchangeable function unit located in the 3D printing machine is released from its position and is moved out of the 3D printing machine and a newly pre-adjusted exchangeable function unit is moved into the 3D printing machine and preferably fixed at its target position. The retraction and extension of the exchangeable function unit can take place in one direction, e.g. from one side or from above in relation to the construction plane, moving to the target position in a direct line. However, the retraction and extension can also take place in the form of an arc movement or as a swivel movement in the 3D printing machine at 45° to 90° into or out of the 3D printing machine. The retraction and extension of the function unit can be done manually or automatically. To ensure that the function unit is not damaged during retraction or extension when exchanging it manually, it may be useful to guide the movement via suitable means. This can be done, for example, using linear guides that are either permanently installed in the machine or on the lifting means, or on other auxiliary devices. When the function unit is exchanged automatically, it may be useful to have a suitable receptacle for an industrial robot on the function unit. The robot then grips the function unit through the opening in the system and guides it in a suitable movement out of the 3D printer to a tray, if provided. Another function unit is then placed on another defined tray, which can now be gripped in turn by the robot and moved into position in the 3D printer.

The retraction and extension of the function unit can also take place in such a way that the function unit is retracted moved into a transport device when it is extended. This minimizes the time during which the function unit is in an undefined position and exposed to harmful influences. The lifting means and the function unit can also be guided by the transport device. The function unit is moved into the 3D printing machine in reverse order directly from the transport device, which is placed in the correct position on the 3D printing machine.

A "transport device" in the sense of the disclosure is a suitable means which protects the exchangeable function unit and/or the layer treatment means from harmful external influences, e.g. mechanical damage or contamination, during transport to and from the 3D printing machine by means of the lifting means usually available in an industrial environment. The transport device can preferably be embodied such that storage of the process unit within the transport device is made possible over a longer period of time without degradation or damage to the exchangeable function unit and/or the layer treatment means occurring due to storage time. Again preferably, the transport device can be embodied such that several transport devices can be stacked for storing several exchangeable function units.

"Adjustment devices" in the sense of the disclosure are means by which the functional units of the exchangeable function unit can be preset with respect to their position and alignment relative to each other in such a way that, after insertion of the exchangeable function unit, all functions of the 3D printing process can be performed in the desired and correct manner and no further readjustment is required in the 3D printing machine. For example, in a layer construction process with selective solidification using a print head and binder application, it is possible to preset the application angle of the print head nozzles and the application angle of the coater unit (recoater) and, if necessary, the recoater blade. In laser sintering, for example, the optics, the diode array and the ion laser can be aligned to the coater using an adjustment device. Likewise, in this device other layer treatment means can also be adjusted with respect to the aforementioned devices. The adjustment devices can be permanently mounted on each function unit or can be used separately if required. Any means for setting an exact position, such as a fine thread, is suitable as an adjustment device. An adjustment device preferably also has suitable measuring means to check the adjusted position of the respective layer treatment means. These measuring means can be, without restriction, e.g. mechanical or optical sensors. The measuring means can also be permanently installed on each functional unit or used separately if required.

"Kinematics" in the sense of the disclosure are all technical means which are suitable for defining, guiding, tolerating and/or limiting the relative movement of layer treatment means with respect to one another within an exchangeable function unit or the relative movement of individual parts or assemblies to one another within the layer treatment means.

"Securing means" as used in the disclosure refers to any means suitable for temporarily securing the position of the exchangeable function unit in the 3D printing machine, such as a clip or a jaw or a plurality of quick release fasteners, magnets, snap fasteners, zero point clamps or electromagnetic fasteners. With a suitable choice of acceleration forces for the traversing movement during layer generation in the 3D printer, the weight force can also be a suitable securing means. In addition, the securing means are selected and designed in such a way that the location and position of the exchangeable function unit in relation to the 3D printer is clearly defined and found with repeatable accuracy. To ensure that this is also the case at different temperatures, appropriate measures for length compensation must be provided.

"Connecting means" in the sense of the disclosure may be rails, frames or other parts by which the functional units of the exchangeable function unit are connected to each other and arranged in their three dimensions, and which may optionally also serve to support the retraction and extension of the interchangeable function unit into and out of the 3D printing machine. In a specific embodiment, the functional units can also be directly connected to each other and, in addition, means intended for retracting and extending the exchangeable function unit can be attached to the latter. Preferably, the connecting means are designed in such a way that the individual functional units are easily accessible in order to adjust their position or exchange them.

"Closure means" within the meaning of the disclosure is any means used to close the insertion opening for the exchangeable function unit, e.g. a flap, door, slide, row of brushes, etc.

"Supply" in the sense of the disclosure is the supply of energy, construction material or other media such as, for example, compressed air or cooling water to the individual functional units. The supply is preferably configured for quick coupling by suitable measures. The coupling preferably takes place at a common coupling position in the form of a coupling strip or a coupling block. The supply can preferably be coupled without additional manual interaction, e.g. only by moving it in and out.

For the purposes of the disclosure, "preset" means that the functional units contained in the exchangeable function unit are aligned in terms of location and position such that simply moving them to the target position, using the securing means and establishing the supply is sufficient to enable the 3D printing machine to be returned to operation immediately after such movement, without substantially requiring any adjustment or readjustment or any setting in relation to the exchangeable function unit.

"Target position" in the sense of the disclosure is the position in the 3D printing machine up to which the exchangeable function unit is inserted and at which it is preferably fixed with the securing means.

"Removal position" as used in the disclosure means the location in the 3D printing machine at which the function unit must be located in order to extend it from the machine. Accordingly, the control of the 3D printer has a command upon which the exchangeable function unit approaches the removal position with sufficient accuracy. Advantageously, this position is above the construction field. Even more advantageously, the removal position is approximately in the middle above the construction field. The two possible end positions of the exchangeable function unit are less suitable, as the maintenance units for the construction field tools are usually located there and these could be damaged during retraction or extension. When exchanging the function unit, the construction field tools should advantageously not be in engagement with a current layer. This can be ensured, for example, by lowering the construction platform by an appropriate amount beforehand. This process can also be stored in the control system so that the lowering of the construction platform and the movement to the removal position takes place as a combined sequence in preparation for the replacement of the function unit.

An object underlying the application is achieved by a production device, e.g. a 3D printing device, whose construction field tools, i.e. in the case of a 3D printing device, the functional units needed for the printing process, are connected to one another and arranged in such a way that they can be removed together from the device while maintaining their alignment with one another and with the device, or the correct alignment of the functional units can be set before installation.

Furthermore, an object underlying the application is achieved in that a second arrangement of construction field tools can be inserted into the device, adjusted to each other and connected to the device in the same way, so that the production process can be continued in the same way.

Furthermore, an object underlying the application is achieved in that auxiliary means are also provided for changing the construction field tools, said auxiliary means allowing the device to be exchanged quickly and put back into operation in short order.

Furthermore, an object underlying the application is achieved by a method that uses the devices provided by the production device or the exchangeable function unit.

Furthermore, an object underlying the application is achieved, in particular, by an exchangeable function unit suitable for a 3D printing method, said functional unit comprising or consisting of at least two functional units comprising at least one material application means and/or smoothing means for applying and/or smoothing a fluid and at least one means for selectively solidifying the fluid, and optionally comprising further layer treatment means, wherein the functional units are each single, double, triple or multiple, and wherein the functional units are mechanically connected to each other directly or by a connecting means.

With the device according to the invention, it is advantageously possible to reduce or avoid the downtimes of 3D printing machines caused by maintenance work or the necessary replacement of parts or functional components that are susceptible to wear. Thus, the machine running time can be increased and it becomes possible to integrate one or more 3D printing machines equipped with such exchangeable function units into an assemblage of other production systems, e.g. in series production, e.g. in vehicle construction.

The invention thus makes it possible for the first time to integrate 3D printing machines into substantially fully automated production processes.

Previously, certain 3D printed parts had to be pre-produced and these parts could be a time-limiting factor in other production processes. In addition, storage and delivery involved organizational effort and costs.

The invention makes it possible to produce 3D molded parts directly on site and integrated into other semi-automated or fully automated manufacturing processes. This makes it possible to simplify complex manufacturing processes.

A further advantage is that machine availability per se is increased and thus a further increase in the actual and economic degree of utilization of 3D printing machines equipped with exchangeable function units according to the invention can be achieved.

The invention thus advantageously contributes to further automation of 3D printing processes per se as well as other manufacturing processes and types of series production using 3D printing processes.

Furthermore, due to the coupling of the print head and the coater in a function unit in an embodiment according to the present disclosure, the steps of particulate material application and selective solidification can be carried out when the exchangeable function unit passes over the construction field. If there is a recoater on both sides of the print head, or if there is a unit comprising a recoater and print head for each direction of travel, both steps can be carried out in each of the two directions of travel, thus accelerating the coating speed and the molded part build-up. This essentially halves the time required to produce the molded parts compared to a 3D printing machine that only performs both steps in one direction at a time.

Furthermore, the exchangeable function unit according to the invention achieves a decoupling of the adjustment of the functional units and their installation in the 3D printing machine. The invention also achieves many process and cost advantages, as the adjustments of the parts to be replaced can now be made outside the 3D printing machine.

In further aspects, the exchangeable function unit according to the disclosure is characterized in that the material application and/or smoothing means is at least one of a recoater, an extruder or a coating knife, the selective solidification means is an inkjet print head, nozzles, a radiation source and/or an energy source, the fluid is a particulate material or a liquid or mixtures of both, that an optional layer treatment means is selected from radiation sources and/or energy sources and application means for gases or liquids, that the connecting means is one or more connecting rails, a frame, a connecting grid or a connecting plate.

The exchangeable function unit disclosed herein is provided for a 3D printing machine and has further advantageous embodiments, wherein the function unit is retractable into and extendable out of a device for 3D printing and wherein the function unit or the layer construction device has at least one suitable receiving means and/or securing means by which the function unit is positionable in the 3D printing device.

The exchangeable function unit disclosed herein may have suitable receiving means and/or securing means and these are preferably one or more quick release fasteners, magnets, snap fasteners, zero point clamps or electromagnetic fasteners.

A major advantage of the exchangeable function unit disclosed herein is that it can be preset and pre-adjusted outside the 3D printing machine. Advantageously, the functional units can be preset in position to each other and to the 3D printing device.

Another advantage is the shortened downtime in cases of maintenance or failure and replacement of a layer treatment means due to the quick exchange of the function unit.

The position of the exchangeable function unit disclosed herein can be preset using one or more adjustment devices or manufacturing tolerances.

The functional units can be connected directly to each other as an exchangeable function unit or via connecting means. In particular, it is advantageous if one, several or all of the material application means and layer treatment means are designed to be movable relative to one another on the connecting means.

In an exchangeable function unit as disclosed herein, the actuators and kinematics required for the relative movement of the material application means and/or layer treatment means can be integrated into the function unit and the energy required for the movement can be supplied to them by the 3D printing device.

In a further aspect, the disclosure relates to a 3D printing device comprising an exchangeable function unit as described above, an insertion opening optionally comprising one or more baffles or/and rails, and further known means of a 3D printing device optionally selected from the group consisting of conveying means, material supply means and/or material removal means.

Such a 3D printing machine has the advantages described above and likewise achieves the objects underlying the application.

Furthermore, a 3D printing device disclosed herein may comprise an insertion opening with a closure means, wherein the closure means can be opened and closed or the closure means is opened or penetrated by the function unit according to any one of claims 1 to 8 during retraction and extension.

In another aspect, the disclosure relates to a method for retracting or/and extending, i.e. for for changing or exchanging, an exchangeable function unit as described above into or out of a 3D printing device, wherein the function unit is optionally moved to the 3D printing device by a lifting means, optionally a crane, a lifting platform or a lifting trolley, the function unit is inserted into the insertion opening, is positioned at the target position in the 3D printing device and is secured by means of one or more securing means.

With such a method, it is possible for the first time to simply exchange several functional units quickly and easily without the need for complicated adjustment work on the machine itself during the exchange and the associated disadvantages described. Advantageously, an exchangeable function unit is used which comprises several functional units and which are pre-adjusted, so that time-consuming and costly adjustment work on the machine itself is not necessary.

Further aspects of the disclosure will be described below.

In well-known 3D printing machines, print heads and coating blades are essential wear parts. In addition, there are exposure units and/or irradiation units, depending on the process.

These units must be aligned with each other within a certain framework for a good print result. The coater defines the spatial position of the layer plane and the print head should be guided at as constant a distance as possible from the layer plane.

If a single component is exchanged, it must be adjusted to the respective other components, depending on the individual configuration. Due to the size of the machines, the manufacturing accuracy of the parts in relation to each other is usually not sufficient to achieve the desired result without adjustment.

Adjustment in the machine can also be a laborious task, as it takes place in a confined space and accessibility is not given. In addition, the system may need to be put in a special safe set-up mode to allow an operator to handle the units. After all, there may be process media in the machine from which the set-up personnel must be protected.

The solution disclosed herein provides an exchangeable function unit in which process-relevant units can be removed as one assembly from the system and replaced by another pre-adjusted unit without the need to set up the units in the system relative to each other.

An exchangeable function unit can consist of at least one coater and one or two print heads, which may additionally be movable transversely to the coater direction via an offset axis.

The coater is a unit for dispensing fluid media such as particulate materials, resins, slurries or pastes in a defined form onto a substrate so that a flat layer of this media of predetermined thickness is formed. A coater can be used to apply pulverulent/particulate materials.

The coater could, for example, be configured as a roller that rotates in the opposite direction to the coating direction. A particulate material reservoir could be added to the roller. The reservoir could, for example, dose particulate material in front of the roller in a controlled manner via a rotary feeder.

A further embodiment relates to an oscillating coater with a powder reservoir suspended in an oscillating manner and a gap in the lower region, on a side of the powder reservoir which points in the coating direction, said gap being as wide as the construction field. The coater also has a drive that makes the reservoir oscillate, causing the powder to trickle out of the gap.

In one aspect, inkjet-type devices can be used as print heads, but it is also conceivable to use selective exposure units such as lasers, projectors or mirrors via which selective irradiation units can be projected onto the construction field. Alternatively, other devices can be used for the transfer of information, such as toners or ink transfer rollers known from laser printers or offset printing, for example.

In addition, other units such as exposure units may be attached, which act similarly to the coater over the entire width of the unit. These exposure units can emit energy to the construction field, e.g. in the UV range but also in the heat radiation range. It is also conceivable that drying units are attached, which work, for example, via the supply and removal of hot air.

In addition to these components in the exchangeable function unit, it is also conceivable, however, that the exchangeable function unit consists of combinations of several coaters, one or more print heads and several irradiation units.

For example, the exchangeable function unit can consist of a combination of two coaters, each coating in one direction only, and one or more print heads in between to generate the layer information. In addition, one radiation source can be located on each of the coaters.

The exchangeable function unit may have a support on which the various units are mounted and adjusted to each other. The support may have means for easy reception and fixation in the layer construction system.

All media for supplying the exchangeable function unit can be easily coupled in the system. The receptacles can be designed in such a way that different exchangeable function units can be interchanged without further effort.

The exchange in the system can be designed in such a way that the exchangeable function unit can be moved out of the system and into the system via auxiliary devices without any risk of damage to the layer construction system as well as the exchangeable function unit. Suitable auxiliary devices are, for example, full-extension mechanisms or transport frames with corresponding receptacles. The auxiliary devices can be permanently installed on the machine or can be inserted as required. In another embodiment, the exchangeable function unit is extended out of and retracted into the 3D printer via an industrial robot.

The auxiliary devices or transport devices are designed in such a way that the process unit can be moved for further use or maintenance with simple means of transport such as a trolley, forklift or crane after it has been removed from the layer construction system.

In the system itself, traversing axes are mounted in such a way that they can easily pick up the exchangeable function unit and move it across the construction field. Preferably, only one pair of axes is required for this, which is located parallel to the coating direction on each side of the construction field.

In one embodiment, the exchangeable function unit is moved from one reversal position to the other and produces a fully processed layer during this movement.

The machine may also have maintenance units that affect parts of the exchangeable functional unit and that also need to be approached from time to time. This can be, for example, a print head cleaning station and/or a recoater cleaning station. In alternative embodiments, such maintenance units could also be mounted on the exchangeable function unit and exchanged with it.

The system also has units for supplying the exchangeable function unit with media, such as powder materials, inks and energy.

The exchangeable function unit can also have data processing units, control assemblies and sensors such as a print head controller, signal interfaces/fieldbus elements, electric/pneumatic valves and a wide variety of sensors for monitoring the unit and process states.

The exchangeable function unit can, for example, have various sensors for monitoring the layer construction process. A sensor could be, for example, a camera in line form, where the image of the processed layer is created by moving the process unit.

The assembly and adjustment of the exchangeable function unit is carried out outside the layer construction system. For this purpose, devices are preferably provided which facilitate assembly, disassembly, inspection and, in particular, adjustment of the units on the support of the exchangeable function unit. In particular, the support and the construction field tools are designed in such a way that they can be installed or exchanged independently of the other construction field tools.

In another aspect, the material supply in the recoater may be sufficient for at least one layer.

To minimize component defects, there may be a horizontal offset axis for the print head that shifts nozzles transversely to the coating direction in a specific or random manner after each or several layers.

The pre-adjustment options can be selected in a variety of ways depending on the requirements of the processes and materials.

Pre-adjustment options may include:
the possibility of adjusting the recoaters to each other,
the possibility of adjusting the process unit to the machine frame of the 3D printing machine,
optionally, a line scan camera for process monitoring,
adjustment possibilities within the process unit,
the print head is adjustable perpendicular to the placement surface,
the recoater is adjustable in parallel alignment and height to the construction field,
the recoater is adjustable individually and/or at an angle to the construction field,
the sensor system for monitoring the unit and the process is adjustable,
the lamp(s) is/are adjustable to the construction field.

Furthermore, quick couplings for all media and lines, suitable shut-off valves allowing to hold back the printing media, and adaptable voltage regulators to adapt the printing module control can be combined with the exchangeable function unit.

Furthermore, it is possible to work within advantageous tolerances, e.g. 0.01 to 0.05, preferably of 0.03 mm, for accuracy or/and parallel alignment.

In one aspect, an exchangeable function unit may be provided with a double-acting recoater in the center and two print heads. The recoater can be mounted in the exchangeable function unit in a vibration-free manner.

In one aspect, the recoater could be arranged upside down (recoater gap facing out) and this could allow the print and recoating image of each layer to be visible and facilitate quality assurance. For example, one could then take a photo of each layer from above and evaluate it using image processing software. The passive recoater must then be able to be lifted by means of suitable actuators so that the layer just applied is not damaged.

In one aspect of the present disclosure, the exchange-able function unit can be arranged on a gantry by means of 4 combined receiving and securing means. In this way, it can be achieved that the pre-assembled function units and in particular the recoater and the print head(s) adopt an advantageous alignment not only with respect to each other but also with respect to the construction plane, thus meeting high quality requirements.

In one aspect, the receiving and securing means with degrees of freedom, together with a receiving and securing means without degrees of freedom, prevent static overdetermination of the function unit in the machine and also allow for thermal expansion effects. This advantageously prevents tensioning of the function unit and a resulting change in position.

In addition, the symmetrical arrangement of the receiving means enables equal stiffnesses both in the machine and in the function unit in order to absorb the process forces as far as possible without distortion and thus without positional changes.

The degrees of freedom can also be interchanged and do not necessarily have to be arranged/executed in this configuration.

In one aspect, at least 3 receiving means are useful to ensure the correct orientation of the function unit in the machine in terms of position and location. In addition, at least 1 securing means can be used, or at least 1 of the 3 receiving means can be embodied as a combined receiving and securing means.

In a further aspect, the receiving means may be any centering and force receiving means commonly used in mechanics. These include, for example, but are not exclusive to, centering pins, bearing surfaces, bolts, centering balls, lead-in chamfers. AH fixing mechanisms commonly used in mechanics can serve as securing means, both manually operated and automated. These include, for example, but are not exclusive to, toggle clamps, swing clamps, latches, ball lock pins, clamping bushes.

In particular, according to the present disclosure, easy replacement of wear parts without downtime of the 3D printing machine can be achieved.

In the exchangeable function unit (1) according to the present disclosure, the print head and recoater axes are pre-adjusted to each other without requiring further adjustment after placement in the 3D printing machine. Advantageously, the X and Y axes are pre-adjusted to each other outside the 3D printing machine.

In one aspect, certain dimensions and ratios of the machine parts may be advantageous, as described below.

With the exchangeable process unit according to the present disclosure, advantageous centering accuracies of the receiving means can also be achieved, which have a positive effect on the 3D printing process.

A minimum requirement may be as follows:

±half the resolution of the material application means; potentially advantageous: more accurate than ±1/10 of the resolution of the material application means, but not more accurate than ±1 µm.

An exemplary machine can work as follows:

Print resolution=200 dpi=127 µm→1/10 of 127 µm=127 µm. Thus, a preferred centering accuracy is better than ±12.7 µm. This results in a centering accuracy of ±5 µm for the components used.

Exemplary height tolerance of the levelling coater elements (blade, roller or coating knife) in the direction of the construction field normal at any measuring point along the coater width:

Exemplary minimum requirement: <±33% of the layer thickness.

Potentially advantageous: <±20% of the layer thickness, or <±10% of the layer thickness.

An exemplary spacing of the levelling coater elements of several coaters in the direction of the construction field normal at any measuring point along the coater width within an exchangeable function unit is as follows:

Exemplary minimum requirement: <±20% of the layer thickness

Potentially advantageous: <±10% of the layer thickness

An exemplary machine can work as follows:

Layer thickness 280 µm→perpendicular dimensional tolerance of the recoater blades to each other at any measuring point along the blade: ±20 µm (corresponds to 7% of the layer thickness).

When using a print head as a material application means; The print head is orthogonal to the direction of movement of the function unit (with the surface normal of the construction field as the imaginary axis of rotation).

An example minimum requirement: <±5% of the print width. Potentially advantageous: <±1% of the print width, or <±0.1% of the print width.

An exemplary machine can work as follows:

Print width W 1,300 mm→allowed rotation of the print head around the perpendicular line ±0.1 mm/1,300 mm (corresponds to 0.08%).

EXEMPLARY DESCRIPTION OF THE DISCLOSURE

Various aspects of the disclosure will be described below by way of example, without being construed as restrictive. Also, any aspect from the example figures shown below can be made usable in any combination.

FIG. 1 shows an exchangeable function unit (1) in two different embodiments. In FIG. 1A, the exchangeable function unit (1) has two recoaters (2) mounted on the left and right of a print head (3) in the coating direction. In addition, the exchangeable function unit has further layer treatment means such as IR radiators (4), which are also provided on both sides. If the print head in this arrangement has a nozzle distribution that is as wide as the construction field, a layer can be processed in one pass. The embodiment shown in FIG. 1B only has one recoater (2) and a print head (3). The advantages of the exchangeable function unit can also be used in this configuration. Furthermore, the exchangeable function unit (1) has a radiation source as a layer treatment means (4). In both embodiments, the construction field tools are connected to each other by means of a plate as a connecting means (5). Securing means (7) are attached to the plate (5) using which securing means (7) the exchangeable function unit (1) assumes a defined position and orientation in the 3D printing machine at the target position.

Figure 2:
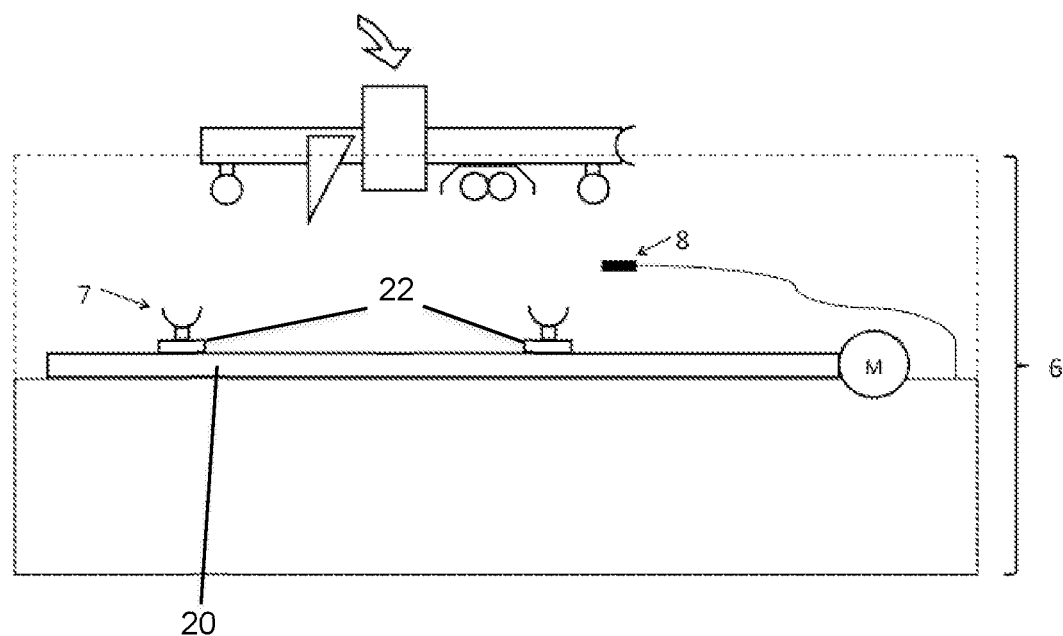
FIG. 2: schematic view of the fastening and supply options of an exchangeable function unit according to the disclosure.

FIG. 2 shows a schematic representation of a 3D printing machine (6). Securing means (7) for the exchangeable function unit (1) are shown at the target position, to which the exchangeable function unit (1) with its counterparts (7') can be coupled. The traversing axes for the exchangeable function unit have already been brought into the removal position. The exchangeable function unit is detachably coupled to an energy and media supply (8).

Figure 3:
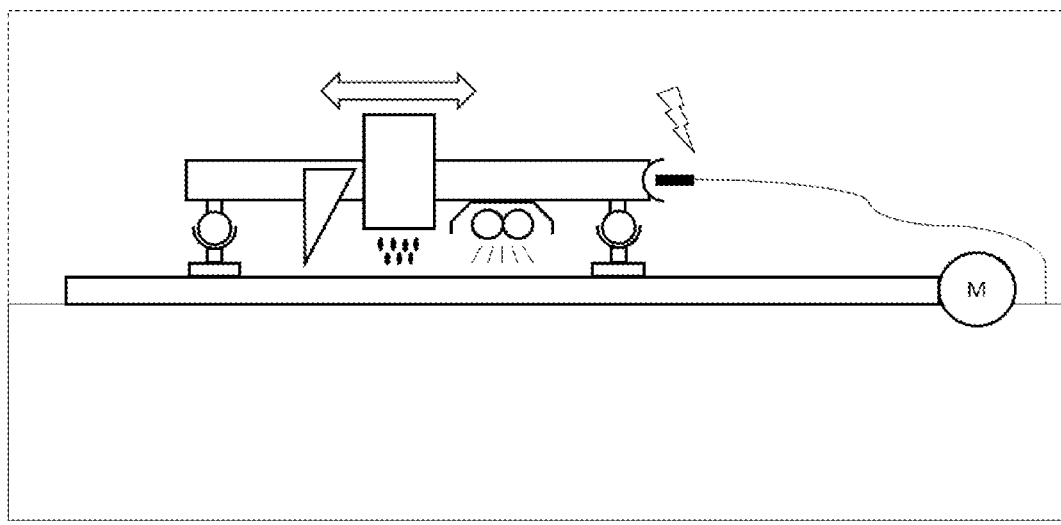
FIG. 3: schematic view of an operational exchangeable function unit in its target position according to the disclosure.

FIG. 3 shows the exchangeable function unit (1) fixed in the target position via receiving and securing means (7, 7') and coupled to the energy and media supply (8).

Figure 4:
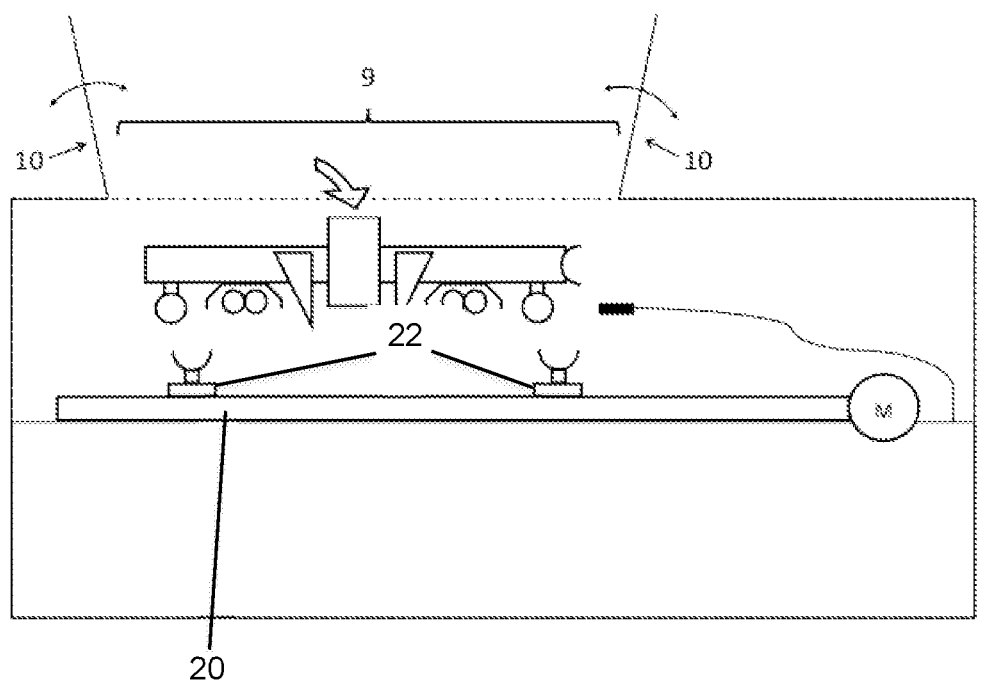
FIG. 4: schematic view of an insertion opening with closure means according to the disclosure.

FIG. 4 schematically shows the retraction of the exchangeable function unit (1) into a 3D printing machine (6). For this purpose, the exchangeable function unit (1) can be retracted into the 3D printing machine via the insertion opening (9). To this end, the closure means (10) are opened and closed again after retraction. After reaching the target position, the exchangeable function unit (1) is secured in the target position by receiving and securing means (7, 7').

Figure 5:
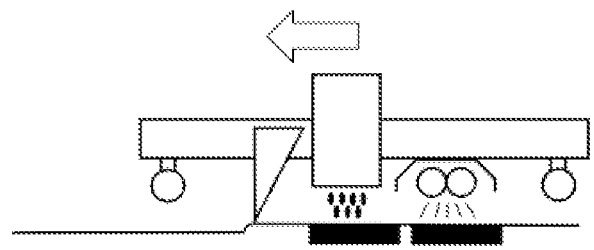
FIGS. 5 and 6: schematic illustration of the layer construction process by means of various exchangeable function units according to the disclosure.

FIG. 5 shows an exchangeable function unit (1B) passing in one direction during the printing process.

Figure 6:
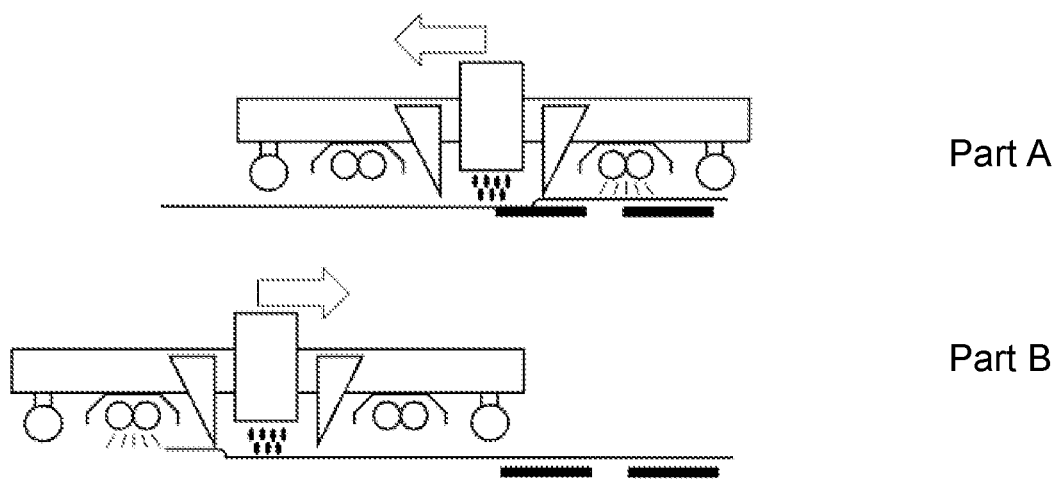

FIG. 6 schematically shows a printing pass of an exchangeable function unit (1A) in one direction (Part 6A) and in the opposite direction (Part 6B). The structure of a print layer is clearly visible.

Figure 7:
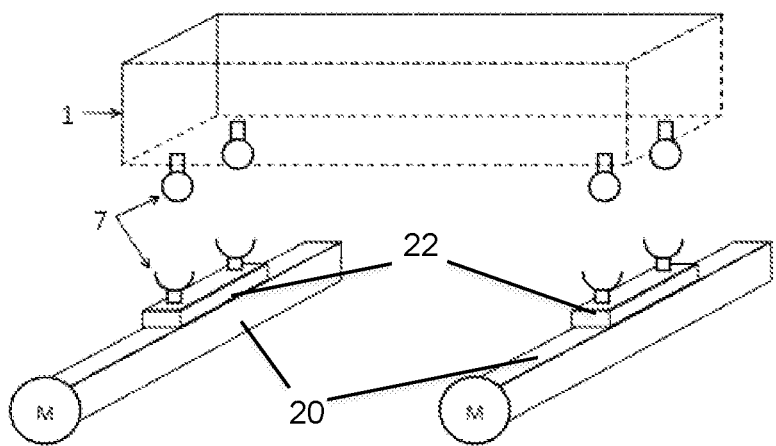
FIGS. 7-9 show the above-described embodiments of the arrangement of the exchangeable function unit on a gantry by means of 4 combined receiving and securing means.
Figure 8:
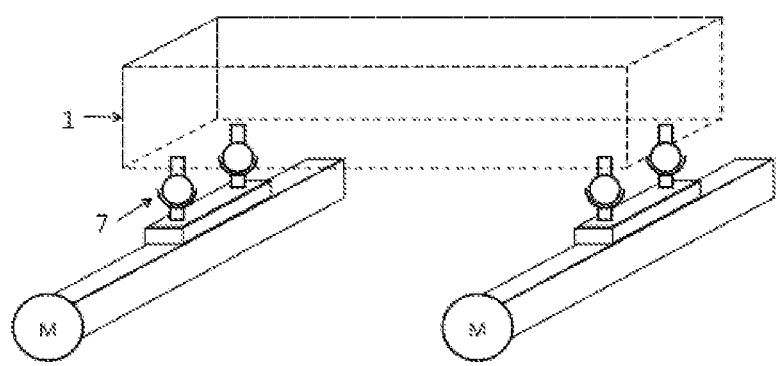
Figure 9:
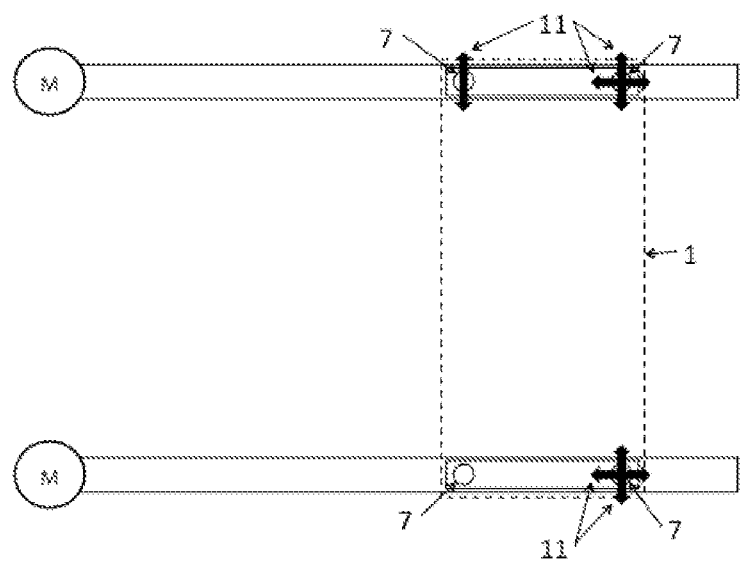

FIGS. 7-9 show the above-described embodiments of the arrangement of the exchangeable function unit on a gantry by means of 4 combined receiving and securing means.

In particular, FIG. 9 shows the degrees of freedom provided in the 4 receiving and securing means so that any function unit can always be received in the correct position and location. Here, the receiving and securing means without degrees of freedom (without arrows) defines the position of the function unit in the machine. The receiving and securing means with one degree of freedom (1 arrow) prevents the rotation of the function unit around the first receiving and securing means as a pivot point. This second receiving and securing means thus partly defines the position of the function unit in the machine. The two receiving and securing means with 2 degrees of freedom (2 crossed arrows) prevent the function unit from tilting (twisting) around the imaginary axis between the first and second receiving and securing means. They thus complete the position definition of the function unit in the machine.

The receiving and securing means with degrees of freedom, together with a receiving and securing means without degrees of freedom, prevent the static overdetermination of the function unit in the machine and also allow for thermal expansion effects. This prevents tensioning of the function unit and a resulting change in position.

In addition, the symmetrical arrangement of the receiving means enables equal stiffnesses both in the machine and in the function unit in order to absorb the process forces as far as possible without distortion and thus without positional changes.

Figure 10:
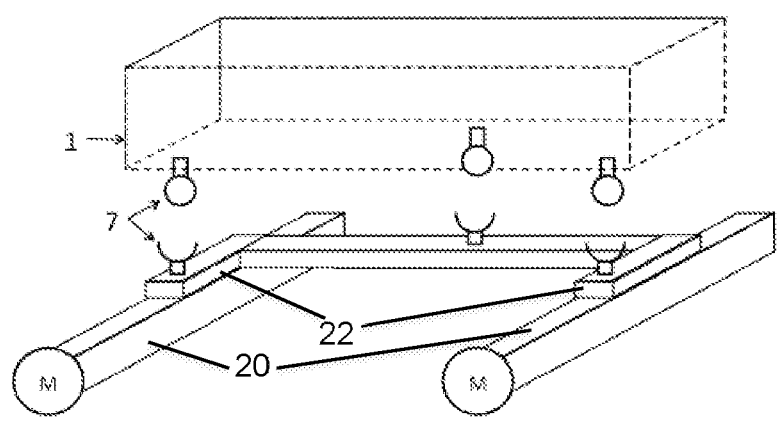
FIGS. 10 to 12 show a further embodiment of the quantity and arrangement of the receiving and securing means.
Figure 11:
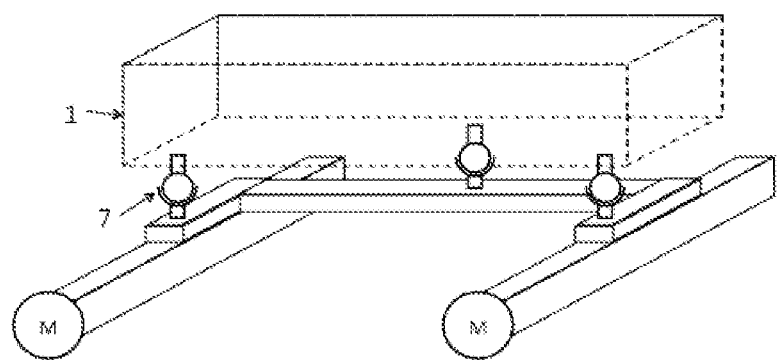
Figure 12:
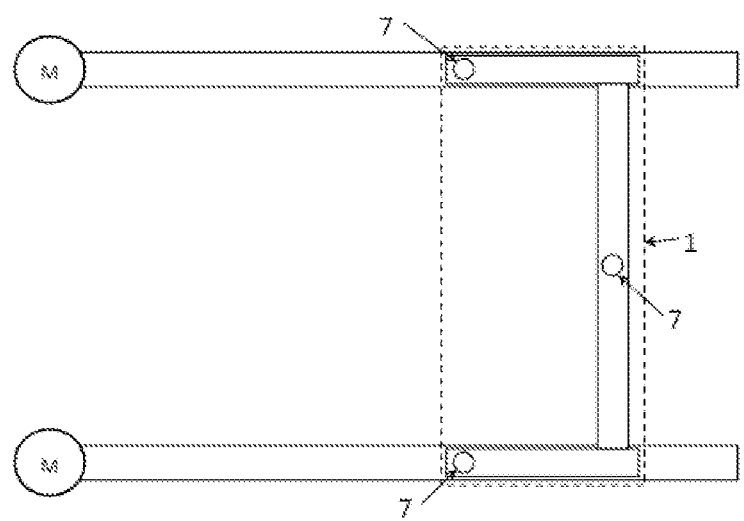

The degrees of freedom can also be interchanged and do not necessarily have to be arranged/embodied in this configuration, FIGS. 10 to 12 show a further embodiment of the number and arrangement of the receiving and securing means. There is no need to use 4 pieces. At least 3 receiving means are useful to ensure the orientation of the function unit in the machine in the correct position and location. In addition, at least 1 securing means must be used, or at least 1 of the 3 receiving means can be configured as a combined receiving and securing means. The Figures show 3 combined receiving and securing means.

Figure 13:
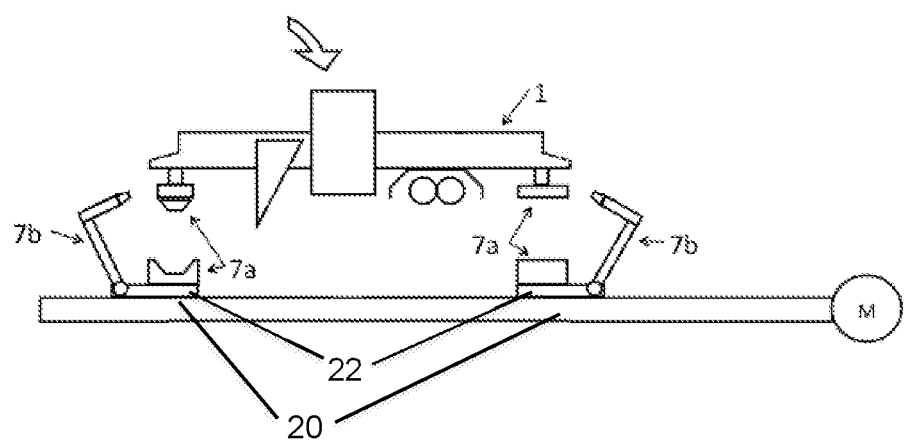
FIGS. 13 and 14 show an embodiment of the invention in which the receiving means and securing means of the exchangeable function unit are designed separately from one another.
Figure 14:
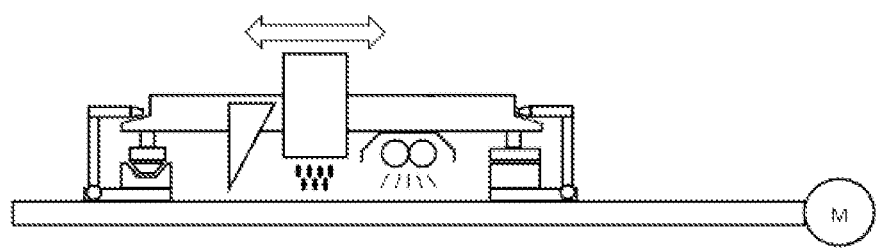

FIGS. 13 and 14 show an embodiment of the invention wherein the receiving means and securing means of the exchange-able function unit are separate from one another. The correct position and location of the function unit within the machine is ensured by the receiving means. The securing means then ensure that this orientation in the correct position and location is maintained and is not changed, for example, by the acceleration forces and vibrations that usually act on the function unit in the machine during operation. The receiving means may be any centering and force receiving means commonly used in mechanics. These include, for example, but are not exclusive to, centering pins, bearing surfaces, bolts, centering balls, lead-in chamfers. All fixing mechanisms commonly used in mechanics can serve as securing means, both manually operated and automated. These include, for example, but are not exclusive to, toggle clamps, swing clamps, latches, ball lock pins, clamping bushes.

LIST OF REFERENCE NUMERALS 1 exchangeable function unit
2 material application and/or smoothing means
3 means for selective solidification
4 optional layer treatment means
5 connecting means
6 device for 3D printing
7 receiving means and/or securing means
8 energy supply of the exchangeable function unit
9 insertion opening
10 closure means
11 translational degrees of freedom of the receiving means and/or securing means
20 rail (e.g., parallel to coating direction)
22 gantry (e.g., including traversing axes)

What is claimed is:

1. An exchangeable function unit for a 3D printing device, said exchangeable function unit comprising at least two functional subunits comprising at least one material application means and/or smoothing means for respectively applying and/or smoothing a fluid, at least one means for selectively solidifying the fluid, and optionally a layer treatment means, wherein the functional subunits are each independently single, double, triple, or multiple, and wherein the functional subunits are mechanically connected to each other directly or by a connecting means, the exchangeable function unit being removably arranged over a gantry by at least three combined receiving and securing means individually provided with and without degrees of freedom.

2. The exchangeable function unit according to claim 1, wherein the at least one material application means and/or smoothing means is at least one of a recoater, an extruder, or a coating knife, the at least one means for selectively solidifying is an inkjet print head, nozzles, a radiation source, and/or an energy source, the fluid is a particulate material, a liquid, or a mixture thereof, the layer treatment means is provided and is selected from radiation and/or energy sources and application means for gases or liquids, and the connecting means is provided and is one or more connecting rails, a frame, a connecting grid, or a connecting plate.

3. The exchangeable function unit of claim 2, wherein the fluid is the particulate material.

4. The exchangeable function unit of claim 3, wherein the exchangeable function unit includes the layer treatment means and the layer treatment means includes the radiation or energy sources.

5. The exchangeable function unit of claim 4, wherein the connecting means is one or more connecting rails, a frame, a connecting grid, or a connecting plate.

6. The exchangeable function unit of claim 2, wherein the connecting means includes connecting rails.

7. The exchangeable function unit of claim 2, wherein the connecting means includes a connecting grid or a connecting plate.

8. The function unit according to claim 1, wherein the exchangeable function unit is retractable into and extendable out of the 3D printing device via the receiving and securing means.

9. The exchangeable function unit according to claim 1, wherein the receiving and securing means comprises one or more of quick release fasteners, magnets, snap fasteners, or electromagnetic fasteners.

10. The exchangeable function unit according to claim 1, wherein the functional subunits are preset in position relative to each other and to the 3D printing device.

11. The exchangeable function unit according to claim 5, wherein the position is preset using one or more adjustment devices or manufacturing tolerances.

12. The exchangeable function unit according to claim 1, wherein one, several, or all of the at least one material application means and the layer treatment means are designed to be movable relative to one another on the connecting means.

13. The exchangeable function unit according to claim 7, wherein actuators and kinematics for the relative movement of the at least one material application means and/or the layer treatment means are integrated into the exchangeable function unit, and wherein energy required for the movement is supplied to the actuators and kinematics by the 3D printing device.

14. The exchangeable function unit of claim 1, wherein the functional subunits comprise the layer treatment means.

15. The exchangeable function unit of claim 1, wherein the functional subunits are each independently double, triple, or multiple.

16. An exchangeable function unit for a 3D printing device, said exchangeable function unit comprising at least two functional subunits including at least one recoater and at least one printhead, and optionally at least one IR radiator, wherein the functional subunits are each independently single, double, triple, or multiple, and wherein the functional subunits are mechanically connected to each other directly or by a connecting means, the exchangeable function unit being removably arranged over a gantry by at least three combined receiving and securing means individually provided with and without degrees of freedom, wherein the gantry moves along parallel traversing axes of the 3D printing device, and optionally wherein the receiving and securing means comprises one or more of quick release fasteners, magnets, snap fasteners, and electromagnetic fasteners.

17. A 3D printing device comprising: an exchangeable function unit according to claim 1, an insertion opening optionally comprising one or more baffles and/or rails, and one or more of a conveying means, material supply means, and/or material removal means,
  wherein the insertion opening comprises a closure means, and wherein the closure means can be opened and closed or the closure means is opened or penetrated by the function unit during retraction and extension thereof.

18. A method for retracting or/and extending an exchangeable function unit according to claim 1, into or out of a 3D printing device the method comprising: moving the exchangeable function unit to the 3D printing device by a lifting means, inserting the function unit into an insertion opening of the 3D printing device positioning the exchangeable function unit at a target position in the 3D printing device, and securing the exchangeable function unit to the 3D printing device by the receiving and securing means.

19. The method of claim 18, wherein the lifting means comprises a crane, a lifting platform, or a lifting trolley.

20. The method of claim 18, further comprising performing length compensation resulting from different temperatures so as to define a location and position of the exchangeable function unit in relation to the 3D printing device.

* * * * *